(12) United States Patent
Cook

(10) Patent No.: US 8,416,407 B2
(45) Date of Patent: Apr. 9, 2013

(54) OPTICAL SPECTROMETER WITH WIDE FIELD OF VIEW FORE-OPTICS

(75) Inventor: Lacy G. Cook, El Segundo, CA (US)

(73) Assignee: Raytheon Company, Waltham, MA (US)

( * ) Notice: Subject to any disclaimer, the term of this patent is extended or adjusted under 35 U.S.C. 154(b) by 424 days.

(21) Appl. No.: 12/772,554

(22) Filed: May 3, 2010

(65) Prior Publication Data

US 2011/0267615 A1 Nov. 3, 2011

(51) Int. Cl.
*G01J 3/28* (2006.01)

(52) U.S. Cl.
USPC ............ 356/328; 356/326; 356/334; 359/399

(58) Field of Classification Search .................. 356/326, 356/328; 359/366, 399
See application file for complete search history.

(56) References Cited

U.S. PATENT DOCUMENTS

| | | | |
|---|---|---|---|
| 4,240,707 A | 12/1980 | Wetherell et al. | |
| 4,598,981 A | 7/1986 | Hallam et al. | |
| 5,260,767 A | 11/1993 | Cook | |
| 5,331,470 A | 7/1994 | Cook | |
| 5,880,834 A | 3/1999 | Chrisp | |
| 6,100,974 A | 8/2000 | Reininger | |
| 7,944,559 B2 * | 5/2011 | Oskotsky et al. | 356/328 |
| 8,018,650 B2 * | 9/2011 | Mann | 359/366 |
| 8,023,183 B1 * | 9/2011 | Cook | 359/366 |
| 8,248,693 B2 * | 8/2012 | Cook | 359/399 |
| 2005/0134844 A1 | 6/2005 | Cook | |

OTHER PUBLICATIONS

Abel, Irving R. et al., "The Pursuit in Symmetry in Wide-Angle Reflective Optical Design," SPIE vol. 237, pp. 271-280, Int'l Lens Design Conf., Mills College, Oakland, CA (May 31-Jun. 4, 1980).
Extended European Search Report dated Jun. 8, 2011 of European Application No. 11154224.7 filed Feb. 11, 2011 (6 pages).

* cited by examiner

*Primary Examiner* — Layla Lauchman
(74) *Attorney, Agent, or Firm* — Lando & Anastasi, LLP

(57) ABSTRACT

Various embodiments provide an optical system including an optical spectrometer, a first negative power mirror configured and arranged to receive radiation from a far-field object, a second positive power mirror configured and arranged to receive radiation reflected by the first negative power mirror, and a third positive power mirror configured and arranged to receive radiation reflected by the second positive mirror and to direct the radiation towards an entrance slit of the optical spectrometer.

19 Claims, 3 Drawing Sheets

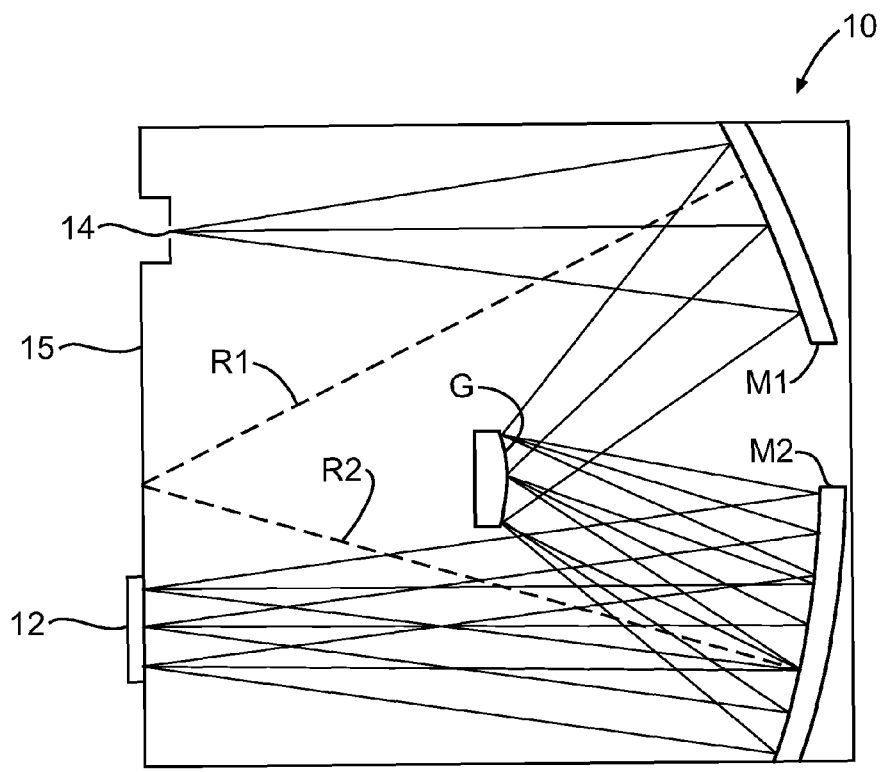
FIG. 1
*(CONVENTIONAL)*
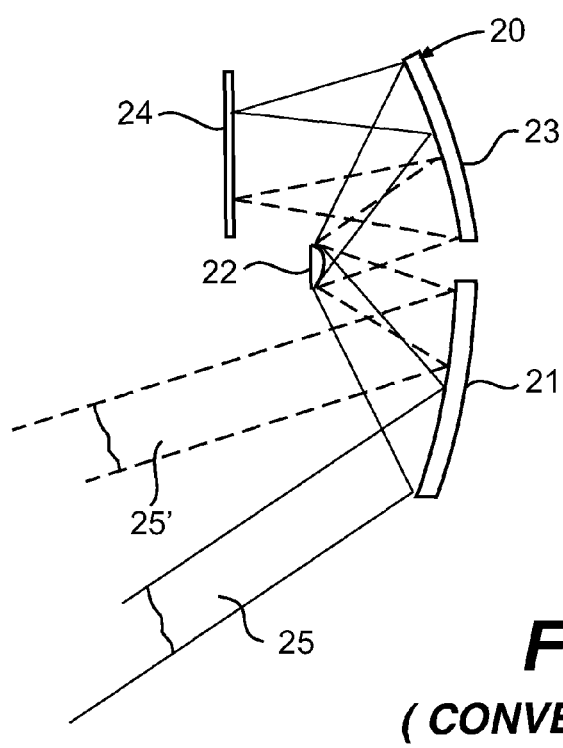
FIG. 2
*(CONVENTIONAL)*

US 8,416,407 B2

OPTICAL SPECTROMETER WITH WIDE FIELD OF VIEW FORE-OPTICS

BACKGROUND

This disclosure pertains to optical spectrometers in general and in particular to an optical spectrometer such as an Offner-Chrisp-type spectrometer using wide field of view imaging fore-optics such as Wide Angle Large Reflective Unobstructed System (WALRUS)-type fore-optics.

Offner-Chrisp spectrometers are extensively used as tools for hyperspectral imaging. The spectrometers allow capture of the spectral signature of an object and provide imaging capabilities with low chromatic aberrations in a relatively compact configuration. The Offner-Chrisp spectrometer has three spherical concentric or near-concentric elements: two concave mirrors and one convex reflective grating. A detailed description of such a spectrometer can be found in U.S. Pat. No. 5,880,834 to Michael P. Chrisp entitled "Convex Diffraction Grating Imaging Spectrometer," the entire contents of which are incorporated herein by reference.

FIG. 1 depicts a conventional Offner-Chrisp spectrometer. Offner-Chrisp Spectrometer 10 includes concave spherical mirrors M1 and M2 and spherical convex reflective diffraction grating G. The spherical mirrors M1/M2 are positioned opposite the grating G. The spherical mirror M1 has a radius R1, and the spherical mirror M2 has a spherical radius R2. Radii R1 and R2 can be equal or different depending on the desired configuration. Offner-Chrisp spectrometer 10 may further include a radiation detector such as a Focal Plane Array (FPA) 12 and entrance slit 14 provided in housing 15 of spectrometer 10 for allowing radiation to enter spectrometer 10. First concave mirror M1 is oriented to receive rays entering through entrance slit 14. The rays reflected by first concave mirror M1 are directed towards grating G. Grating G includes grooves for diffracting incident radiation and dispersing, i.e., resolving the incident radiation into wavelength spectral components. Second concave mirror M2 is oriented to receive the diffracted wavelength radiation component from grating G and to reflect the wavelength radiation components onto focal plane array FPA 12 for detection. Offner-Chrisp spectrometer 10 typically operates in a "pushbroom" configuration where the spectrometer moves in a direction substantially perpendicular to entrance slit 14 to cover or scan a surface of the object.

In order to be able to use an Offner-Chrisp spectrometer in applications such as, for example, remote sensing (e.g., terrestrial or other planetary and space remote sensing), the Offner-Chrisp spectrometer has to be coupled to fore-optics. The fore-optics are configured to receive or capture radiation from a distant object and form an image at the entrance slit of the Offner-Chrisp spectrometer, e.g., entrance slit 14 of Offner-Chrisp spectrometer 10. An example of such optical system combining the use of fore-optics with the use of an Offner-Chrisp-type spectrometer is disclosed in U.S. Pat. No. 6,100,974 to Francis M. Reininger, entitled "Imaging Spectrometer/Camera Having Convex Grating," the entire contents of which are incorporated herein by reference. U.S. Pat. No. 6,100,974 discloses coupling Wetherell-type reflective triplet fore-optics to an Offner-Chrisp-type spectrometer. A detailed description of Wetherell-type fore-optics can be found in U.S. Pat. No. 4,240,707 to Wetherell et al., entitled "All-Reflective Three Element Objective," the entire contents of which are incorporated herein by reference.

FIG. 2 depicts an example of conventional Wetherell-type fore-optics. Wetherell-type fore-optics 20 comprise positive power concave primary mirror 21, negative power convex secondary mirror 22, and positive power concave tertiary mirror 23. Secondary convex mirror 22 is positioned between and opposite primary concave mirror 21 and tertiary concave mirror 23. In operation, radiation emanating from a distant object (represented by radiation beams 25 and 25') impinges on positive power primary mirror 21 which reflects the radiation towards negative power secondary mirror 22. Negative power secondary mirror 22 is positioned and arranged to receive radiation reflected by the positive power primary mirror 21 and to reflect the radiation towards positive power tertiary mirror 23. Positive power tertiary mirror 23, in turn, directs the radiation towards radiation detector 24, or as in the case of the optical system in Reininger, directs the radiation towards the entrance slit (e.g. slit 14 in FIG. 1) of the Offner-Chrisp-type spectrometer for spectral analysis of the radiation.

Conventional Wetherell-type reflective triplet fore-optics provide only a limited field of view (FOV). As a result, the field of view that can be spectrally analyzed by an Offner-Chrisp-type spectrometer may be limited when the fore-optics coupled to the Offner-Chrisp-type spectrometer is Wetherell-type fore-optics.

Therefore, there is a need in the art for fore-optics that can provide a wide field of view (WFOV) that can be coupled to a spectrometer, such as an Offner-Chrisp-type spectrometer, so as to be able, for example, to obtain a wavelength spectrum of a wider area of an object (e.g., to obtain a wavelength spectrum of a wider portion of the surface of the earth, etc.). In this context, a "wide" FOV may be considered, by way of a non-limiting example, to be greater than 20 deg.

SUMMARY

One or more embodiments of the present disclosure provide an optical system including an optical spectrometer, a first negative power mirror configured to receive radiation from a far-field object, a second positive power mirror configured to receive radiation reflected by the first negative power mirror, and a third positive power mirror configured to receive radiation reflected by the second positive mirror and to direct the radiation towards an entrance slit of the optical spectrometer.

Another embodiment of the present disclosure provides an optical system including a first negative power mirror configured to receive radiation from a far-field object, a second positive power mirror configured to receive radiation reflected by the first negative power mirror, and a third positive power mirror configured to receive radiation reflected by the second positive mirror. The spectrometer further includes a grating configured to receive reflected radiation from the third positive power mirror and resolve the radiation into wavelength spectral components.

These and other features and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of this disclosure, the structural components illustrated herein are drawn to scale. It is to be expressly understood, however, that the drawings are for the purpose of illustration and description only and are not intended as a definition of the limits of the inventive concept. As used in the specification and in the claims, the singular form of "a", "an", and "the" include plural referents unless the context clearly dictates otherwise.

BRIEF DESCRIPTION OF THE DRAWINGS

In the accompanying drawings:

FIG. 1 depicts a conventional Offner-Chrisp spectrometer;

FIG. 2 depicts an example of conventional Wetherell-type reflective triplet fore-optics;

DETAILED DESCRIPTION

Figure 3A:
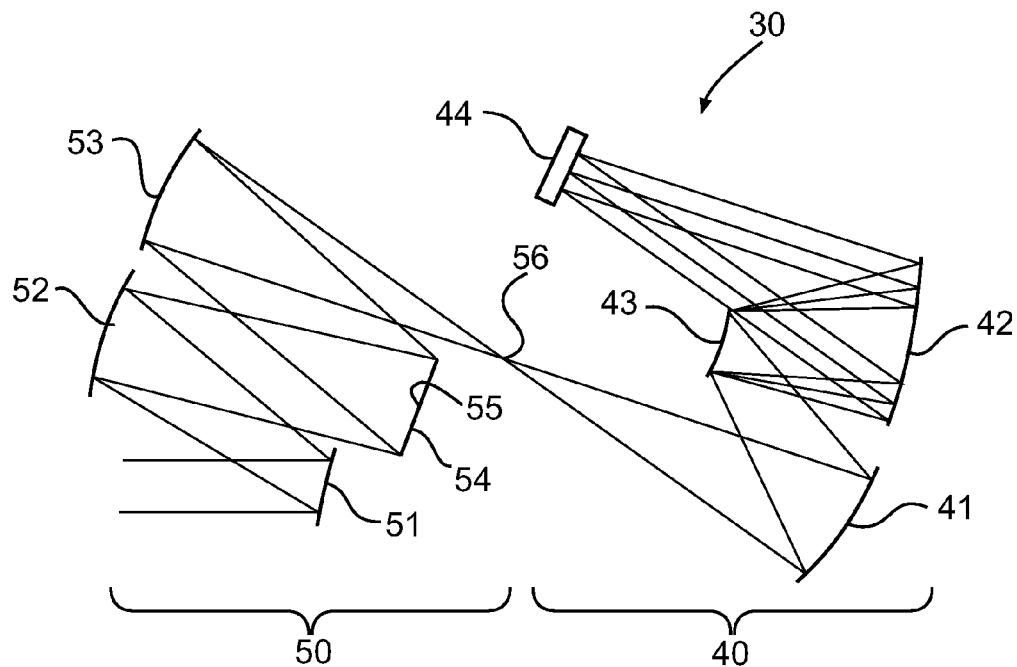
FIG. 3A depicts an optical system comprising an Offner-Chrisp-type spectrometer and fore-optics, according to an embodiment.
Figure 3B:
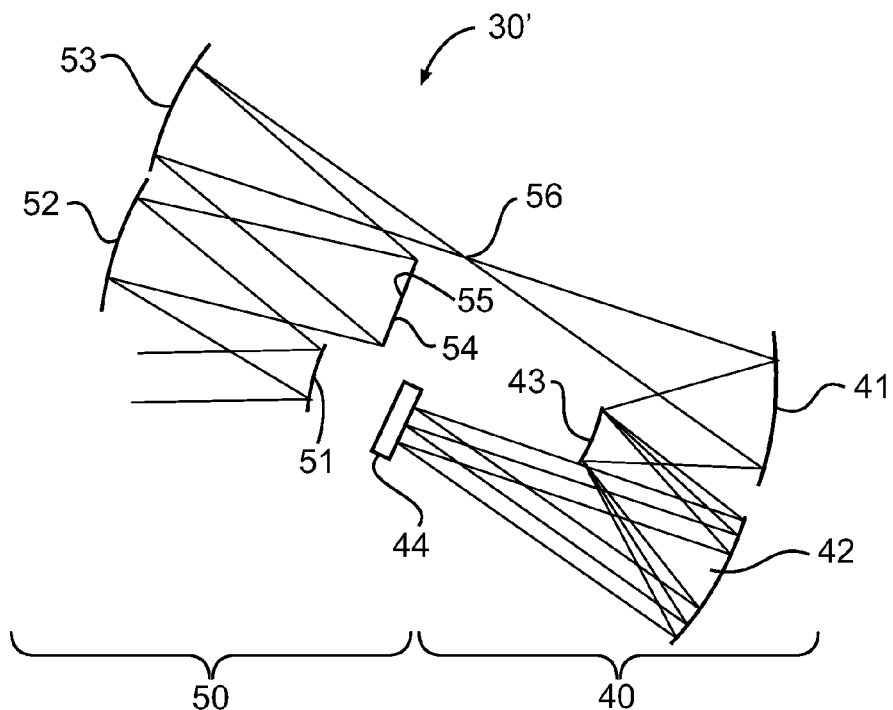
FIG. 3B depicts an optical an optical system comprising an Offner-Chrisp-type spectrometer and fore-optics, according to another embodiment.

FIGS. 3A and 3B depict optical systems comprising an Offner-Chrisp-type spectrometer and foreoptics, according to various embodiments. Optical system 30, 30' comprises Offner-Chrisp-type spectrometer 40 and fore-optics 50. Offner-Chrisp-type spectrometer 40 includes concave spherical mirrors 41 and 42 and spherical convex diffraction grating 43. Spherical mirrors 41 and 42 are positioned opposite diffraction grating 43. Spherical mirror 41 has spherical radius R1 and Spherical mirror 42 has spherical radius R2. Radii R1 and R2 can be equal or different depending on the desired configuration. Offner-Chrisp spectrometer 40 further includes a radiation detector such as Focal Plane Array (FPA) 44. Although mirrors 41 and 42 are described herein as being spherical, as it can be appreciated, mirror 41, or mirror 42, or both, can be aspherical.

In one embodiment, fore-optics 50 is a WALRUS-folded-type fore-optics. An example of a WALRUS-folded-type fore-optics is described in detail in U.S. Pat. No. 5,331,470 to Lacy G. Cook, entitled "Fast Folded Wide Angle Large Reflective Unobscured System," the entire contents of which are incorporated herein by reference. In one embodiment, fore-optics 50 includes first mirror 51, second mirror 52, third mirror 53 and fourth mirror 54. First mirror 51 is a negative power mirror, second mirror 52 is a positive power mirror, third mirror 53 is a positive power mirror, and fourth mirror 54 is a substantially flat mirror. Flat fourth mirror 54 is a non-power mirror which in some embodiments acts only as a fold mirror. In one embodiment, first mirror 51, second mirror 52 and third mirror 53 have higher order aspheric mirror surfaces. In one embodiment, the combined positive power of mirrors 52 and 53 is balanced by the negative power of first mirror 51 to provide a zero Petzval curvature or "flat field" condition at image position located at 56 of spectrometer 40. In addition, fore-optics 50 is a telecentric optical system. First mirror 51, second mirror 52, third mirror 53 and fourth mirror 54 form a telecentric optical system. In yet another embodiment, fourth mirror 54 can be substantially flat paraxially, but having higher order aspheric surface departures. In some embodiments, as taught by Cook in U.S. Pat. No. 5,331,470, the fore-optics aperture stop is located at fourth mirror 54.

In operation of the embodiment depicted in FIGS. 3A and 3B, radiation from a viewed object or a portion of an object at far field impinges first mirror 51. First mirror 51 directs the radiation to second mirror 52. Second mirror 52, in turn, reflects the radiation towards fourth mirror 54. Fourth mirror 54, in turn, reflects the radiation towards third mirror 53. First mirror 51 and second mirror 52 relay a virtual entrance pupil located behind first mirror 51 to real aperture stop 55. At aperture stop 55, fourth mirror (flat fold mirror) 54 is positioned to receive the beam of radiation from second mirror 52 and reflect the beam of radiation towards third mirror 53. Third mirror 53 reflects and focuses the radiation to form an image of the viewed object or a portion of the viewed object at entrance slit 56 of spectrometer 40.

By locating fold mirror 54 between the second mirror 52 and third mirror 53, the optical path is folded back and allows the second and third mirrors 52 and 53 to be positioned adjacent to one another. By using fold mirror 54, the length of fore-optics 50 and, as a result, the length of the whole optical system 30, 30' can be reduced. In one embodiment, by locating aperture stop 55 at fold mirror 54, and applying a higher order aspheric surface departure to fold mirror 54, spherical aberration of fore-optics 50 can be corrected. The three powered mirrors: first mirror 51, second mirror 52 and third mirror 53, together with fold mirror 54, form a compact fore-optics which can provide a two-dimensional field of view, and very fast optical speeds. For example, a field of view equal to or exceeding 20 deg. by 40 deg. (i.e., equal to or greater than 20 deg. in a first direction and equal to or greater than 40 deg. in a second direction perpendicular to the first direction) can be achieved with optical speeds as fast as approximately F/1.0.

First mirror 41 of spectrometer 40 is oriented to receive rays from entrance slit 56. The rays reflected by first mirror 41 are directed towards diffraction grating 43. Diffraction grating 43 includes grooves for diffracting incident radiation and dispersing, i.e., resolving, incident radiation into wavelength spectral components. Second concave mirror 42 is oriented to receive the diffracted wavelength spectral components from grating 43 and to reflect the wavelength spectral components onto focal plane array (FPA) 44 for detection.

By using the WALRUS-type fore-optics 50, a wider field of view (e.g., a field of view equal to or greater than 20 deg. in a first direction and equal to or greater than 40 deg. in a second direction perpendicular to the first direction) can be imaged and spectrally analyzed using an Offner-Chrisp-type spectrometer 40. As can be seen in FIGS. 3A and 3B, the fore-optics 50 use a triplet of mirrors: negative power mirror 51, positive power mirror 52 and positive power mirror 53, along with fold mirror 54. The use of a negative power mirror followed by two positive power mirrors (i.e., in a negative-positive-positive power sequence) allows achieving a wider field of view than is conventionally available. For example, the use of a negative power mirror as a first mirror in the fore-optics 50 allows increasing the field of view, and thus increasing the overall radiation collected or viewed by the fore-optics 50. On the other hand, in the imaging system of Reininger, the fore-optics are provided with a triplet of mirrors with a first mirror having a positive power, a second mirror having a negative power, and a third mirror having a positive power (i.e., in a positive-negative-positive power sequence). This configuration of the fore-optics in Reininger provides a limited field of view in comparison with the field-of-view achieved by using WALRUS-type fore-optics 50.

Optical system 30 depicted in FIG. 3A and optical system 30' depicted in FIG. 3B are similar in many aspects and provide the same overall functionality. One difference is the orientation of first mirror 41 of spectrometer 40, and thus the arrangement of the optical components of spectrometer 40 relative to fore-optics 50. In optical system 30, first mirror 41 is oriented such that rays reflected by mirror 41 are directed away from fore-optics 50. In optical system 30', first mirror 41 is oriented such that rays reflected by mirror 41 are directed towards fore-optics 50.

Figure 4:
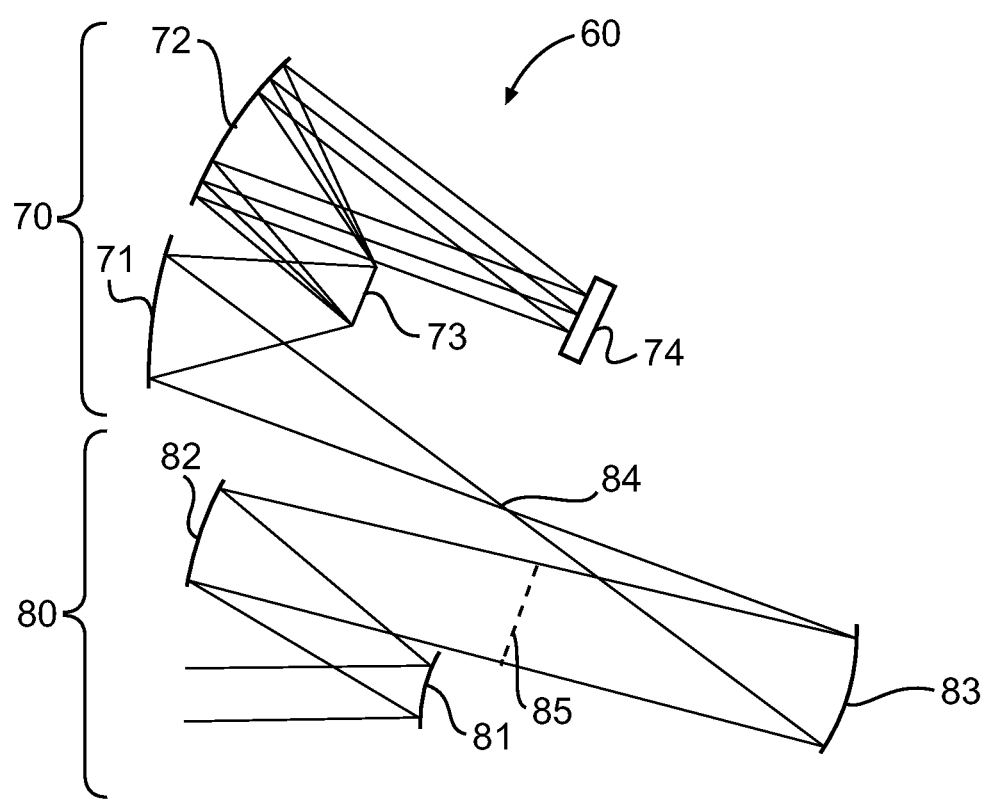
FIG. 4 depicts an optical system comprising an Offner-Chrisp-type spectrometer and fore-optics, according to yet another embodiment.

FIG. 4 depicts an optical system comprising an Offner-Chrisp-type spectrometer and fore-optics, according to another embodiment. Similar to optical systems 30 and 30', optical systems 60 comprises Offner-Chrisp-type spectrometer 70 and fore-optics 80. Offner-Chrisp-type spectrometer 70 includes concave spherical mirrors 71 and 72 and spherical convex diffraction grating 73. Spherical mirrors 71 and 72 are positioned opposite diffraction grating 73. Spherical mirror 71 has spherical radius R1 and spherical mirror 72 has spherical radius R2. Radii R1 and R2 can be equal or different depending on the desired configuration. Offner-Chrisp-type spectrometer 70 further includes a radiation detector such as Focal Plane Array (FPA) 74. Although mirrors 71 and 72 are described herein as being spherical, as it can be appreciated, mirror 71, or mirror 72, or both, can be aspherical.

In this embodiment, fore-optics 80 is a WALRUS-unfolded-type fore-optics. An example of a WALRUS-unfolded-type fore-optics is described in detail in U.S. Pat. No. 4,598,981 to Hallam et al. entitled "Wide-Angle Flat Field Telescope," the entire contents of which are incorporated herein by reference. The WALRUS-unfolded telescope was first developed and described by Williams in 1978 as documented in an article by Abel and Hatch entitled "The Pursuit of Symmetry in Wide-Angle Reflective Optical Designs," SPIE Vol. 237, 1980, pp. 271-280. In one embodiment, fore-optics 80 includes first mirror 81, second mirror 82, third mirror 83. First mirror 81 is a negative power mirror, second mirror 82 is a positive power mirror, and third mirror 83 is a positive power mirror. In one embodiment, first mirror 81, second mirror 82 and third mirror 83 have higher order aspheric mirror surfaces. In one embodiment, the power of the two positive mirrors, i.e., second mirror 82 and third mirror 83, is balanced by the negative power of the first mirror 81 to provide a zero Petzval curvature or flat field condition at an image position located at entrance slit 84 of spectrometer 70. In addition, fore-optics 80 is a telecentric optical system. First mirror 81, second mirror 82 and third mirror 83 form a telecentric optical system.

In operation, as depicted in FIG. 4, radiation from a viewed object or a portion of an object at far field impinges first mirror 81. First mirror 81 receives the radiation and directs the radiation towards second mirror 82. Second mirror 82, in turn, reflects the radiation towards third mirror 83. Third mirror 83 reflects and focuses the radiation to form an image or a portion of the viewed object at entrance slit 84 of spectrometer 70. Hence, radiation emanating from a far field object is focused by fore-optics 80 onto entrance slit 84 of spectrometer 70 for spectral analysis.

Similar to optical systems 30 and 30', by using WALRUS-type fore-optics 80, a wider field of view (e.g., greater than 20 deg.) can be imaged and spectrally analyzed using an Offner-Chrisp-type spectrometer 70. As can be seen in FIG. 4, fore-optics 80 uses a triplet of mirrors: negative power mirror 81, positive power mirror 82 and positive power mirror 83. The use of a negative power mirror followed by two positive power mirrors (i.e., in a negative-positive-positive power sequence) achieved a wider field of view. For example, a field of view exceeding 20 deg. by 40 deg. (i.e., 20 deg. in a first direction and 40 deg. in a second direction perpendicular to the first direction) can be achieved with optical speeds as fast as approximately F/1.0. For example, the use of a negative power mirror as a first mirror in fore-optics 80 allows increasing the field of view and thus increasing the overall radiation collected or viewed by fore-optics 80. One difference between optical system 60 depicted in FIG. 4 and optical systems 30 and 30' is that in optical systems 30 and 30', fore-optics 50 includes fold mirror 54 whereas in optical system 60, fore-optics 80 does not use a fold mirror. In the absence of a fold mirror, as in the WALRUS-unfolded-type fore-optics 80, aperture stop 85 shown in FIG. 4 as a dashed line, is located substantially halfway between second mirror 82 and third mirror 83. However, depending on the desired optical configuration of the fore-optics and the desired telecentricity, the aperture stop 85 can be located anywhere between the second mirror 82 and the third mirror 83.

It should be appreciated that in one embodiment, the drawings herein are drawn to scale (e.g., in correct proportion). However, it should also be appreciated that other proportions of parts may be employed in other embodiments.

Although the inventive concept has been described in detail for the purpose of illustration based on various embodiments, it is to be understood that such detail is solely for that purpose and that the inventive concept is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

Furthermore, since numerous modifications and changes will readily occur to those with skill in the art, it is not desired to limit the inventive concept to the exact construction and operation described herein. Accordingly, all suitable modifications and equivalents should be considered as falling within the spirit and scope of the present disclosure.

What is claimed:

1. An optical system comprising:
   an optical spectrometer; and
   a substantially telecentric fore-optics including:
      a first negative power mirror configured to receive radiation from a far-field object;
      a second positive power mirror configured to receive radiation reflected by the first negative power mirror; and
      a third positive power mirror configured to receive radiation reflected by the second positive mirror and to direct the radiation towards an entrance slit of the optical spectrometer.

2. The optical system of claim 1, wherein the optical spectrometer is an Offner-Chrisp-type spectrometer.

3. The optical system of claim 1, wherein the Offner-Chrisp-type spectrometer comprises:
   a pair of mirrors, one mirror in the pair of mirrors being configured to receive radiation from an entrance slit of the Offner-Chrisp-type spectrometer; and
   a grating disposed opposite the pair of mirrors and configured to receive radiation reflected by the one mirror and to resolve the radiation into wavelength spectral components.

4. The optical system of claim 3, wherein the Offner-Chrisp-type spectrometer further comprises a detector configured to detect the wavelength spectral components.

5. The optical system of claim 1, wherein a combined positive power of the second mirror and the third mirror is balanced by a negative power of the primary mirror to provide a flat field condition at the entrance slit of the optical spectrometer.

6. The optical system of claim 1, wherein the substantially telecentric fore-optics further includes a fourth mirror disposed opposite the second mirror and third mirror, the fourth mirror being configured to reflect radiation received from the second mirror towards the third mirror.

7. The optical system of claim 6, wherein the fourth mirror is substantially flat.

8. The optical system of claim 6, wherein the fourth mirror has higher order aspherical departures.

9. The optical system of claim 1, wherein the first mirror, the second mirror and the third mirror provide a field of view equal or greater than approximately 20 deg. in a first direction and equal to or greater than 40 deg. in a second direction perpendicular to the first direction.

10. The optical system of claim 1, wherein the substantially telecentric fore-optics is a WALRUS-type fore-optics.

11. An optical system comprising:
   an optical spectrometer having an entrance slit;
   a substantially telecentric fore-optics including:
      a first negative power mirror configured to receive radiation from a far-field object;
      a second positive power mirror configured to receive and further reflect radiation reflected by the first negative power mirror; and
      a third positive power mirror configured to receive and further reflect radiation reflected by the second positive mirror to produce an image of the far-field object at the entrance slit of the optical spectrometer; and
   wherein the optical spectrometer includes a grating configured to receive reflected radiation from the third positive power mirror via the entrance slit and to resolve the reflected radiation into wavelength spectral components.

12. The optical system of claim 11, wherein the optical spectrometer further includes a detector configured to detect the wavelength spectral components.

13. The optical system of claim 11, wherein the optical spectrometer is an Offner-Chrisp-type spectrometer.

14. The optical system of claim 13 wherein the Offner-Chrisp-type optical spectrometer further includes a pair of mirrors, one mirror in the pair of mirrors being configured to receive radiation from the third positive power mirror, wherein the grating is disposed opposite the pair of mirrors and configured to receive radiation reflected by the one mirror.

15. The optical system of claim 13, wherein the substantially telecentric fore-optics is a WALRUS-type fore-optics.

16. The optical system of claim 14, wherein the pair of mirrors includes two concave, spherical mirrors.

17. The optical system of claim 1, wherein the first, second, and third mirrors have higher order aspheric departures.

18. The optical system of claim 1, wherein an aperture stop of the fore-optics is located between the second and third mirrors.

19. The optical system of claim 6, wherein an aperture stop of the fore-optics is located at the fourth mirror.

\* \* \* \* \*